3,258,496
PRODUCTION OF PURIFIED ORTHOFORMIC ESTERS

George Kesslin, Teaneck, N.J., and Alvin Charles Flisik and Robert Wesley Handy, Stony Point, N.Y., assignors to Kay-Fries Chemicals, Inc., West Haverstraw, N.Y., a corporation of New York
No Drawing. Filed Sept. 9, 1963, Ser. No. 307,310
3 Claims. (Cl. 260—615)

This application is a continuation-in-part of our application Serial No. 844,649, filed October 6, 1959, and now Patent No. 3,121,751.

This invention relates to the production of purified orthoformic esters and more particularly to the production of orthoformic acid esters having substantially lesser quantities of nitrogeneous impurities.

Methods are known for producing orthoformic esters from an alcohol and hydrogen cyanide. One method as disclosed in the Copenhaver Patent No. 2,527,494 is an improvement in the so-called Pinner process. In the Copenhaver process, the formiminoester hydrohalides, formed in a first step, are reacted with an alcohol at a temperature of 45° C. and a pH of 6 in the presence of an inert liquid which is a non-solvent for the ammonium halide formed as a by-product of the reaction.

However, in the commercial production of orthoformic esters from methanol and hydrogen cyanide by known processes, we have found that the orthoformic esters contain heretofore unsuspected nitrogen contaminants, such as symmetrical triazine, which importantly interfere, for example, with the reactions of the orthoformic esters with vinyl ethers, in the presence of boron trifluoride catalyst, to produce tetraethers of propane. The presence of the s-triazine was definitely confirmed by spectroscopic analysis, by its melting and boiling point and by nitrogen analysis. While other nitrogenous contaminants may be present, the s-triazine is the major nitrogenous contaminant and may represent 95% thereof.

We have also found that other nitrogenous impurities of an undetermined nature are present in the orthoformic esters heretofore produced from other monoalcohols and hydrogen cyanide. These other nitrogenous impurities adversely affect the odor of the orthoformic esters and may have other disadvantageous effects yet undetermined.

It is a primary object of the present invention, therefore, to produce purified orthoformic esters having substantially lesser quantities of nitrogenous impurities. More particularly, it is a special object of the invention to produce orthoformic esters, especially methyl orthoformate, substantially free of nitrogenous impurities in general and s-triazine in particular. Other features and objects of the invention will become apparent from the greater detailed description which follows.

In a broad aspect, this invention embodies the process of removing nitrogen containing impurities from a reaction mass containing a formiminoester hydrohalide, a monohydroxy alcohol, and an inert liquid diluent.

In accordance with one important embodiment of the invention purified orthoformic acid esters, having substantially lesser amounts of nitrogenous impurities, are produced by reacting a formiminoester hydrohalide with a monohydric alcohol under definitely acidic conditions in which the pH does not exceed 3. As in the Copenhaver patent, the reaction is carried out in the presence of an inert liquid diluent which is a non-solvent for the ammonium halide. Hydrocarbon solvents which are non-solvents for ammonium halides are preferred. Halogenated hydrocarbon solvents may be used also. Where methyl orthoformate is being produced, the alcoholysis preferably takes place at 15–20° C. in the presence of a hydrohalide which is the same as the hydrohalide present in the formiminoester. The alcohol should be present during the alcoholysis step in a molar excess of 20% or more. Where higher molecular weight trialkyl orthoformates are being produced, higher reactions temperatures between 25–40° C. may prove to be advantageous. In this way, the orthoformic acid esters can be produced which are substantially free of nitrogenous impurities and in a very satisfactory yield. These orthoformic acid esters, advantageously methyl orthoformic ester, may be used efficiently as intermediates in the production of tetraalkoxy propanes and other chemicals.

The significance of this embodiment of the invention will be apparent from a comparison of the purity of the methyl orthoformic ester produced in accordance with this embodiment of the invention and in accordance with Example 1 of Copenhaver. A methyl orthoformic ester was produced by following the exact procedure as set out in Example 1 of Copenhaver. The distillate obtained contained 3.2% of s-triazine. Even by modifying Example 1, within the scope of the general teachings of Copenhaver, it was not possible to obtain a methyl orthoformate containing less than 0.2 to 1.0% of s-triazine.

When the formiminoester hydrochloride reaction mass produced in the first step of the Copenhaver process was not treated to adjust the pH to 6 and when the pH of the second step was maintained at 3 in accordance with this invention, a methyl orthoformic ester was obtained which was substantially free of s-triazine. It was possible to keep the s-triazine concentration in the orthoformic ester distillate consistently below 0.05%, or even below 0.02%, by carrying out the alcoholysis at a pH of 3. Methyl orthoformic ester formed in accordance with this invention reacted, without further purification, with methyl vinyl ether in the presence of small catalytic quantities of boron trifluoride to produce tetramethoxy propane in very high yields. On the other hand, it was found that the presence of 0.1% of the s-triazine in the methyl orthoformate materially inhibited the formation of the tetramethoxy propane while the presence of as much as 0.4% of the s-triazine was sufficient to make the production of the tetramethoxy propane from the orthoformic ester impractical.

We have found that if methanol is reacted with molar quantities of hydrogen cyanide in the presence of molar quantities of a hydrogen halide to produce the methyl formiminoester hydrohalides, sufficient hydrogen halide remains unreacted to maintain a pH of not more than 3 in the subsequent alcoholysis step provided the initial reaction mass is not neutralized and provided the alcoholysis is not carried out at temperatures substantially above 25° C. On the other hand, when the alcoholysis is carried out at temperatures substantially above 25° C., such as at temperatures of 30° C. and above, it is necessary to introduce dry HCl, or other acid, into the reaction mass during the alcoholysis step to maintain a pH of not more than 3. Thus, in accordance with a preferred practice of this embodiment of the invention, the methyl formiminoester hydrohalide reaction mass formed in the first conversion step is not neutralized and the methanolysis step is performed at a temperature at which any unreacted hydrogen halide is not vaporized off. At a pH of 3, and below, a temperature of 15 to 18 or 20° C. is adequate to induce the reaction to take place with satisfactory speed and yet give excellent yields. Where the alcoholysis takes place with just enough acid to maintain the desired acidity, it has been found the acidity will gradually disappear when the reaction mass is left standing and a neutralization step, involving the introduction of possible contaminants, can thereby be avoided.

Where, in accordance with the teachings of the preceding paragraph, other alcohols such as ethanol, propanol, or the like, i.e., other lower alkanols containing up to 5–6 carbon atoms are used to produce higher molecular tetraalkyl orthoformates it has surprisingly been found that higher temperatures, say 25–40° C., may be used to induce the alcoholysis reaction to take place at satisfactory speeds and yet maintain the reaction mass at the desired acidity.

The following example will serve to further illustrate the invention and that the amount of impurities is controlled by the regulation of pH and, to a certain extent, temperature.

*Example*

Seven hundred and seventy-five grams (775 g.) of diethyl benzene and 96 g. of absolute methanol were jointly added to a reactor equipped with a stirrer and the mixture cooled to −10° C. To this cooled mixture, 81 g. of hydrogen cyanide was slowly added. Then 109.5 g. of hydrogen chloride was bubbled into the reaction mixture over a period of 2–3 hours while maintaining the temperature of the reaction mixture between −10 and 0° C. After the addition of the hydrogen chloride, the reaction mixture was agitated for approximately 20 hours while maintaining the temperature between −10 and 0° C. In this way, methyl formiminoester hydrochloride is provided. After the formation of the formiminoester, 230 g. of absolute methanol was added while maintaining the temperature of the reaction mass below 0° C. After this second addition of methanol, the reaction mixture was heated to 15° C. and maintained at a temperature between 15–18° C. for six hours. The pH of the reaction mass did not exceed 3 and it was continuously acidic to Congo red. Care was exercised to control the reaction temperature so that the reaction mass remained acidic to Congo red throughout the methanolysis. During the alcoholysis with the methanol, the ammonium chloride by-product precipitated out as a salt cake. The alcoholysis reaction mixture was filtered at 15° C. to separate out the salt cake and the salt cake was washed twice with 100 ml. of diethyl benzene. The resulting filtrate was still acidic to Congo red. After standing for 6 hours at room temperature, the acidity of the filtrate disappeared. During the period of standing, a small amount of crystalline material developed so the filtrate was refiltered and this filtrate subjected to distillation in a known manner through a packed distillation column at a temperature not exceeding 135° C.

In this way, a trimethyl orthoformate free of triazine was obtained in yield equalling 77% of the hydrogen cyanide consumed. Any important quantities of unreacted hydrogen cyanide and methanol and substantially all of the diethyl benzene were suitable for reuse in the production of further quantities of the methyl orthoformic ester.

In accordance with another embodiment of this invention, the orthoformic esters are purified by reacting nitrogenous impurities with a heavy metal salt to form a complex coordination compound. The reaction may be easily effected at room temeprature by agitation of the impure products with the heavy metal salt. The coordination compounds are separated from the reaction mixture by filtration, advantageously after stirring the heated mass with an adsorbent, and the purified orthoformic esters are recovered by fractional distillation in accordance with past practices. This and the succeeding embodiments of the invention may be used to purify the reaction products of the Copenhaver process, mentioned above, or to further purify the products obtained by the process set out in the Example hereof.

Various heavy metal salts may be used to form the coordination compounds including $CuCl_2.2H_2O$,

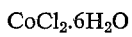
$CoCl_2.6H_2O$ and $ZnCl_2$ and other halides of heavy metals, i.e., metals below the alkaline earth metals in the electro-chemical series. In this way, the nitrogenous impurities can be eliminated and the methyl orthoformic ester can be produced having an s-triazine content less than 0.01%. Other heavy metal salts work to somewhat less advantage such as $NiCl_2.6H_2O$, $AlCl_3$ and $FeCl_3$. It will be seen that the orthoformic esters purified with the heavy metal salts are sufficiently free of nitrogenous impurities for use as intermediates.

In accordance with another embodiment of the invention, the nitrogenous impurities are removed from the impure orthoformic esters by the use of an ion exchange resin. The nitrogenous impurities may be removed by flowing the impure orthoformic ester over a bed of an acidic ion exchange resin. A suitable ion exchange resin may be obtained from the Dow Chemical Company under the trade designation of Dowex 50W–X12. This resin is a cation exchange resin composed substantially of a sulphonated styrene divinyl benzene copolymer.

In accordance with a further embodiment of the invention, it has been found that certain impure orthoformic esters of the prior art can be importantly purified by the careful introduction of small quantities of hydrohalides, preferably hydrogen chloride, to produce a neutral reaction mass and then separating the formed precipitate before the conventional distillation. The acid should be added gradually and its addition discontinued as soon as the precipitates are no longer formed. The separation of the solid impurities by filtration is facilitated by the introduction of an adsorbent such as nuchar. For example, when a trimethyl orthoformate containing 0.048% of triazine, such as produced in conformity with prior art practices, is treated with 0.4% HCl and with sufficient nuchar to absorb the impurities for ½ hour at room temperatures, filtered and the filtrate subjected to distillation, a purified trimethyl orthoformate is produced containing only 0.004% triazine.

While applicants do not wish to be bound by a theory as to how the purification takes place, it seems apparent from applicants' discovery of the nature of the impurities that the three embodiments set out immediately above are attributable to the formation of addition compounds between the nitrogenous impurities and acidic compounds present in the purifying agents.

In accordance with yet another embodiment of the invention, where higher orthoformic esters are produced, such as ethyl orthoformic ester and higher alkyl esters, the nitrogenous impurities are separated from the impure esters by fractional distillation. After identifying the impurities, their separation was possible due to the difference in their boiling point and the boiling point of the higher esters. Such a purification procedure could not be used on the trimethyl orthoformate which is the most important orthoformic ester from a commercial viewpoint.

Certain advantages are obtained by converting the formiminoester hydrohalides into the orthoformic esters at an acidity of at least pH 3 and some of these advantages have been set out above. For example, a neutralization of the formiminoester hydrohalide reaction product has been found to be unnecessary and a product of commercially acceptable purity can be obtained without the additional purification steps set out herein. On the other hand, the other separate purification steps mentioned above, especially treatment with a hydrohalide or a heavy metal salt, are more effective in removing the unidentified noxious nitrogenous substances representing a minor fraction of the nitrogenous impurities. Thus the purification procedures set out herein representing a separate treatment of the impure orthoformic esters prior to their recovery by distillation may be used independently, or conjointly if desired, with a control of of the pH in the alcoholysis step to a pH of not more than 3.

Numerous details have been given to illustrate the practice of the invention. It will be apparent, however, that the principles of the invention are applicable to the production of orthoformic esters from alcohols and hydrogen

What is claimed is:

1. A process for removing nitrogen-containing impurities from lower alkyl orthoformic esters which comprises reacting said impurities with a heavy metal halide to form an addition compound and separating the alkyl orthoformic ester from the formed addition compound.

2. A process for removing nitrogen-containing impurities from lower alkyl orthoformic esters which comprises reacting said impurities with an acidic ion exchange resin to form an addition compound and separating the alkyl orthoformic esters from the formed addition compound.

3. A process for removing nitrogen-containing impurities from lower alkyl orthoformic esters which comprises reacting said impurities with a hydrogen halide to form an addition compound and separating the alkyl orthoformic ester from the formed addition compound.

References Cited by the Examiner

UNITED STATES PATENTS 2,527,494  10/1950  Copenhaver _____ 260—615

LEON ZITVER, *Primary Examiner.*

B. HELFIN, *Assistant Examiner.*